July 26, 1955  G. E. SCHULTZ  2,714,026
ROTATING TOOL CONNECTOR
Filed Aug. 3, 1954
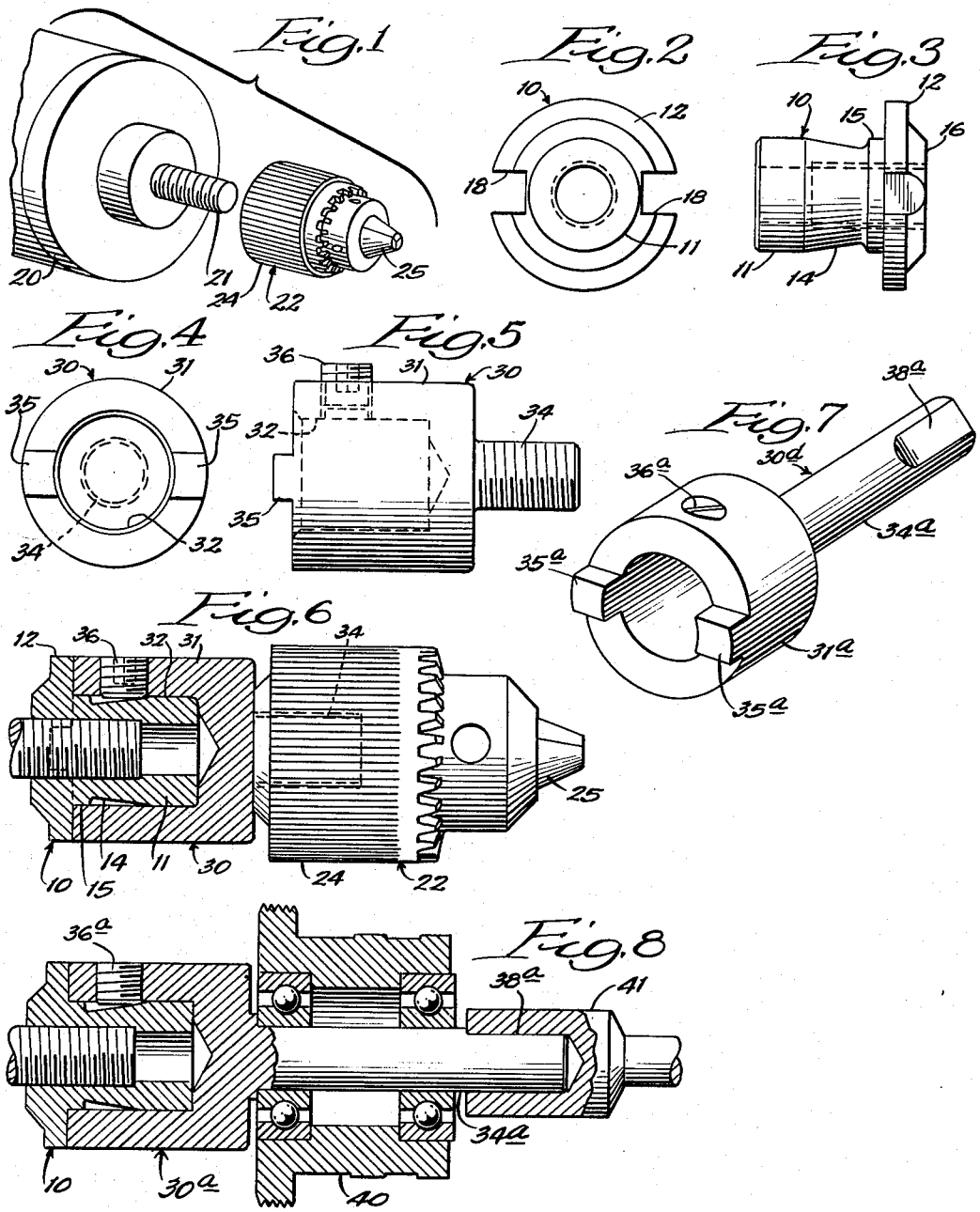
INVENTOR:
George E. Schultz,
BY
ATTORNEY.

United States Patent Office 2,714,026
Patented July 26, 1955

2,714,026

ROTATING TOOL CONNECTOR

George E. Schultz, Chicago, Ill., assignor to
R. C. S. Engineering Corp.

Application August 3, 1954, Serial No. 447,593

6 Claims. (Cl. 287—2)

The present invention relates to the general field of connectors for rotating elements. In particular the invention relates to a power tool connector which is interchangeably coupled to a key chuck or spindle drive.

Over the recent years there has been a remarkable growth in the field of all-purpose hand-operated power tools. In many such units the hand drill is the basic power unit. Numerous manufacturers offer a wide variety of attachments which look for their source of power to the hand-operated power drill. The usual workpiece grip for a power drill is a chuck. The chuck is usually key-operated or hand tightened on the drill bit or tool which it grips and drivingly rotates. Some of the attachments used with a hand-operated power drill are circular saws, polishing wheels, reciprocating saw blade attachments, and nearly as many additional adaptations as there are power tools used by the home craftsman.

When many of these auxiliary tools are used, it is the usual practice to insert a shaft which drives the tool into the chuck of the power drill. Several operational disadvantages result from this practice. With a key-operated chuck, and particularly with a hand-tightened chuck, the operator does not always secure a tight connection, nor is the drive shaft of the attached tool always properly aligned. In operation, wobble may develop in the drive shaft. This induces, in time, scoring of the attached tool drive shaft, and uneven operation as well as the possibility of eventual slippage, overheating and inoperability of the attached tool.

It is the principal object of the present invention to permit the interchangeable attachment of rotary driven tools to a power source by a direct drive.

An additional object of the invention is to provide for the rapid interchangeability on a power driven hand tool from the use of a key chuck to a driven shaft so that a wide variety of power tools are readily interchangeable.

It is a further object of the invention to eliminate the chuck from a power operated drill when other power tools are used, thereby reducing slippage, wobble, and resultant scoring of the shaft caused principally by a failure of the operator to properly lock his chuck.

Further objects and advantages of the invention will become apparent as the following description proceeds, taken in connection with the accompanying drawings, in which:

Figure 1 is a perspective exploded view of the driving means and chuck of a power drill.

Fig. 2 is the end view of a spindle for the interchangeable driving unit.

Fig. 3 is a plan view of the spindle shown in Fig. 2.

Fig. 4 is an end view of the driving cup which cooperates with the spindle of Figs. 2 and 3.

Fig. 5 is a plan view of the driving cup shown in Fig. 4.

Fig. 6 is a partial sectional view of the spindle and cup with an associated key chuck.

Fig. 7 is a perspective view of another driving cup, such as illustrated in Figs. 4, 5 and 6, but intended for a different driving application.

Fig. 8 is a partial sectional plan view of the driving cup illustrated in Fig. 7 attached to the driving spindle of Figs. 2 and 3 for use with a power driven reciprocating saw.

In broad outline, the construction shown in the drawings which exemplifies the invention, contemplates a two-element connector for a power driven hand drill. Other sources of power for driving tools may, of course, be similarly adapted to such a connector as contemplated by the present invention. Two basic elements have been shown in the drawings, a mushroom headed spindle 10 and a cup-shaped connector 30, 30a. In operation the mushroom headed spindle 10 fits over the drive shaft 21 of the drill 20, and the cup-shaped connector 30, 30a fits over the barrel-shaped body 11 of the mushroom headed spindle 10 and is locked in that position by means of a tooth 35, 35a and slot 18 and secured against longitudinal displacement by a set screw 36, 36a.

More specifically, the details of the construction appear in the accompanying drawings. Fig. 1 shows the driving end of a power driven hand-operated drill 20, normally electrically powered. At the driving portion of the power drill 20 there is usually a threaded drive shaft 21. A chuck, shown here as a key locking chuck 22, is threaded on to the drive shaft 21 of the power drill 20. A key 24 is, in operation, inserted into the key hole 25 and the chuck tightened on to its work piece by means of rotating the key 24.

In order to eliminate the key chuck, or any other type of drill chuck, as the driving connector when the tool is used for driving other power tools, a mushroom headed spindle 10 is provided for threading on to the drive shaft 21 of the power tool 20 in place of the drill chuck 22.

Referring now to Figs. 2 and 3, it will be seen that the mushroom headed spindle 10 comprises a cylindrical body 11 and a mushroom-like head 12. The body of the spindle 11 is bored internally and threaded from the head end for a mating fit with the drive shaft 21 of the associated power tool. The body 11 of the spindle 10 has a taper 14 which necks down near the mushroom head 12 at the shoulder 15. The mushroom head 12 is in the form of a circular disc heading the spindle 10, and has a tapered boss 16 at its extreme end portion. Slots 18 are provided at diametrically opposed stations on the spindle head 12, dimensioned to fit the teeth 35, 35a of the connector cup 30, 30a as will be described below.

The connector cup, one version of which is shown in Figs. 4, 5 and 6, comprises a barrel-shaped body 31 with a hollow bore 32 dimensioned to fit the outside diameter of the spindle body 11 with a snug mating fit. A threaded drive shaft 34 extends from the closed end portion of the cup 30 of a diameter and thread controlled by the chuck which it is intended to cooperate.

Teeth 35 extend at diametrically opposed stations at the open end of the cup body 31, and are dimensioned for a mating fit with the tooth slots 18 of the head 12 of the spindle 10. A set screw 36 is located in the cup body 31 at a position which will permit it to rest within the tapered portion 14 of the spindle body 11, thereby securing the cup 30 from longitudinal displacement along the spindle 10 while the teeth 35 prevent rotational displacement of the cup on the spindle body 11.

Referring now to Fig. 6, the mushroom headed spindle 10 and connector cup 30 are shown in their operational relationship with a key chuck 22. It will be seen that the cup 30 is securely fixed to the spindle 10 and that the key chuck 22 rides on the cup 30 much as it was attached to the power tool 20 on the drive shaft 21 as illustrated in Fig. 1. To remove the key chuck from the spindle 10 in order that another power tool be attached to the spindle 10, the operator need only release the set screw 36 and remove the connector cup 30 with its associated drill chuck 22.

It will be appreciated that for the use of this type of tools different dimensions and shaftings may be employed as the driving extension from the cup 30. For example, in Fig. 7, the driving cup 30a has been shown with an unthreaded drive shaft 34a. A flat 38 on the shaft 34a facilitates the drive of the mounted tool. Otherwise the cup body 31a, its associated teeth 35a and the set screw 36a are dimensioned, proportioned, and finished the same as the driving cup 30 to which the key chuck 22 has been attached.

For operation with a power driven reciprocating blade saw, the driving cup 30a attaches in the manner shown in Fig. 8. There it will be seen that the saw attachment driving cup 30a is fixed to the mushroom headed spindle 10 in the manner as shown and described above. The drive shaft 34a, however, is inserted through the bearing retainer 40 of the power driven reciprocating saw (not shown) and the flat 38a of the drive shaft 34a is inserted into the drive coupling 41 of the power driven reciprocating saw.

From the foregoing description it will be seen that a wide variety of power driven hand tools may be readily attached to a single driving source such as hand drill 20, with only one tool being needed for the set screw 36. By eliminating the use of a chuck for attaching the tools, a much more direct and satisfactory driving connection is established between the power source and the driven tool thereby eliminating the disadvantages of driving through a drill chuck.

Although the particular embodiment of the invention has been shown and described in some detail here, there is no intention to thereby limit the invention to the details of such an embodiment. On the contrary, the intention is to cover all modifications, alternative embodiments, usages and equivalents of the connector as fall within the spirit and scope of the invention as expressed and defined in the specification and the appended claims.

I claim as my invention:

1. An interchangeable connector for power driven tools having a drive shaft comprising, in combination, a spindle having a central bore and a slotted head, means in the bore of the spindle for attachment to the power tool drive shaft, a cup adapted to fit snugly over the body of the spindle, a tooth on the cup which rests within the spindle head slot, means for securing the cup against longitudinal displacement along the spindle, and a drive shaft extending from the closed end of the cup coaxial with the power tool drive shaft.

2. An interchangeable connector for power driven tools having a drive shaft comprising, in combination, a spindle having a central bore, a spindle head having diametrically opposed slots, means in the bore of the spindle for attachment to the power driven shaft, a cup adapted to fit snugly over the body of the spindle, diametrically opposed teeth on the cup which fit within the spindle head slots, means for securing the cup against longitudinal displacement along the spindle, and a drive shaft extending from the closed end of the cup.

3. An interchangeable connector for a hand operated power driven drill having a threaded drive shaft comprising, in combination, a spindle body having a hollow bore and a tapered portion along the body, a head on said spindle having diametrically opposed radial slots, threads in the bore of the spindle for attachment to the power driven shaft, a cup adapted to fit snugly over the body of the spindle, diametrically opposed teeth on the cup which rest within the spindle head slots, a set screw in the cup located for advancement into the spindle body taper securing the cup against longitudinal displacement along the spindle, and a drive shaft extending from the closed end of the cup.

4. In a connector for interchangeably connecting tools to a power shaft; a spindle comprising a cylindrical body, and a mushroomed head, the spindle body having an internal bore adapted for attachment to the power source and a taper along the body of the spindle which tapers toward the spindle head, the spindle head having a circumferential radial slot; and a barrel-shaped cup for connection with the spindle having a bored central portion dimensioned to fit matingly with the spindle body, a tooth extending from the cup body dimensioned for a locking fit within the spindle head slot, a set screw in the cup body located to fit within the spindle body taper thereby locking the cup against longitudinal displacement, and driving means extending axially from the closed end of the cup.

5. In a connector for interchangeably connecting tools to a power shaft; a mushroom headed spindle having a cylindrical body and an internal bore adapted for attachment to the power shaft, a taper along the body of the spindle, a shoulder adjacent the tapered end of the spindle body, such head having a radial slot; and a barrel-shaped cup for connection with the spindle having a bored central portion dimensioned to fit matingly with the spindle body, a tooth extending from the cup body dimensioned for a locking fit within the spindle head slot, a set screw in the cup body located to fit within the spindle body taper thereby locking the cup against longitudinal displacement, and driving means extending axially from the closed end of the cup.

6. In a connector for interchangeably connecting tools to a power shaft; a spindle having a cylindrical body and a head, such spindle being characterized by an internal bore adapted for attachment to the power source, a taper along the body of the spindle which tapers toward the head, and a radial slot in the spindle head; and a barrel-shaped cup for connection with the spindle having a bored central portion dimensioned to fit matingly with the spindle body, such cup being characterized by a tooth extending from the cup body dimensioned for a locking fit within the spindle head slot, a set screw in the cup body located to fit within the spindle body taper thereby locking the cup against longitudinal displacement, and a drive shaft extending axially from the closed end of the cup.

References Cited in the file of this patent
UNITED STATES PATENTS

| | | |
|---|---|---|
| 691,759 | George et al. | Jan. 28, 1902 |
| 2,259,643 | Jones | Oct. 21, 1941 |
| 2,629,616 | McVey | Feb. 24, 1953 |